ial implement;

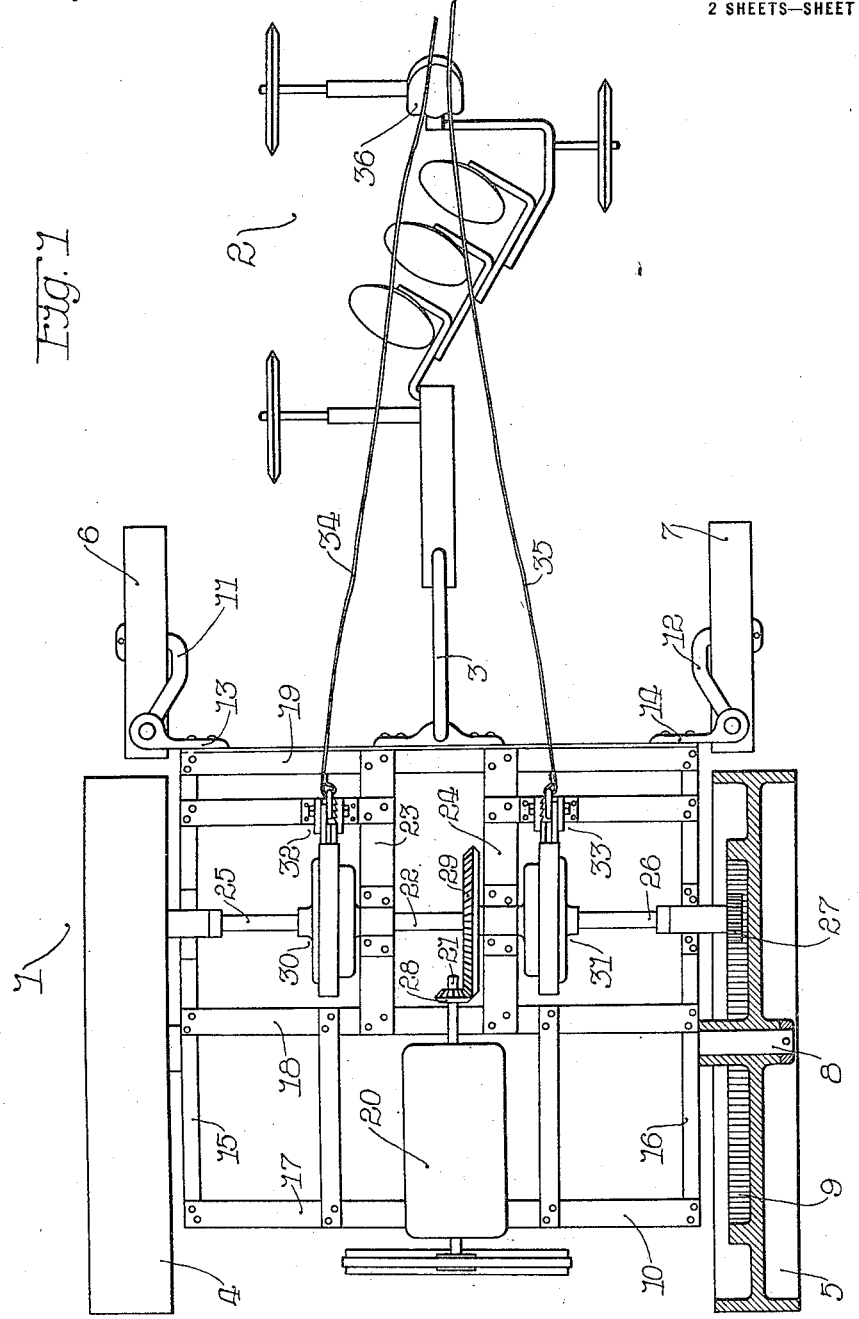

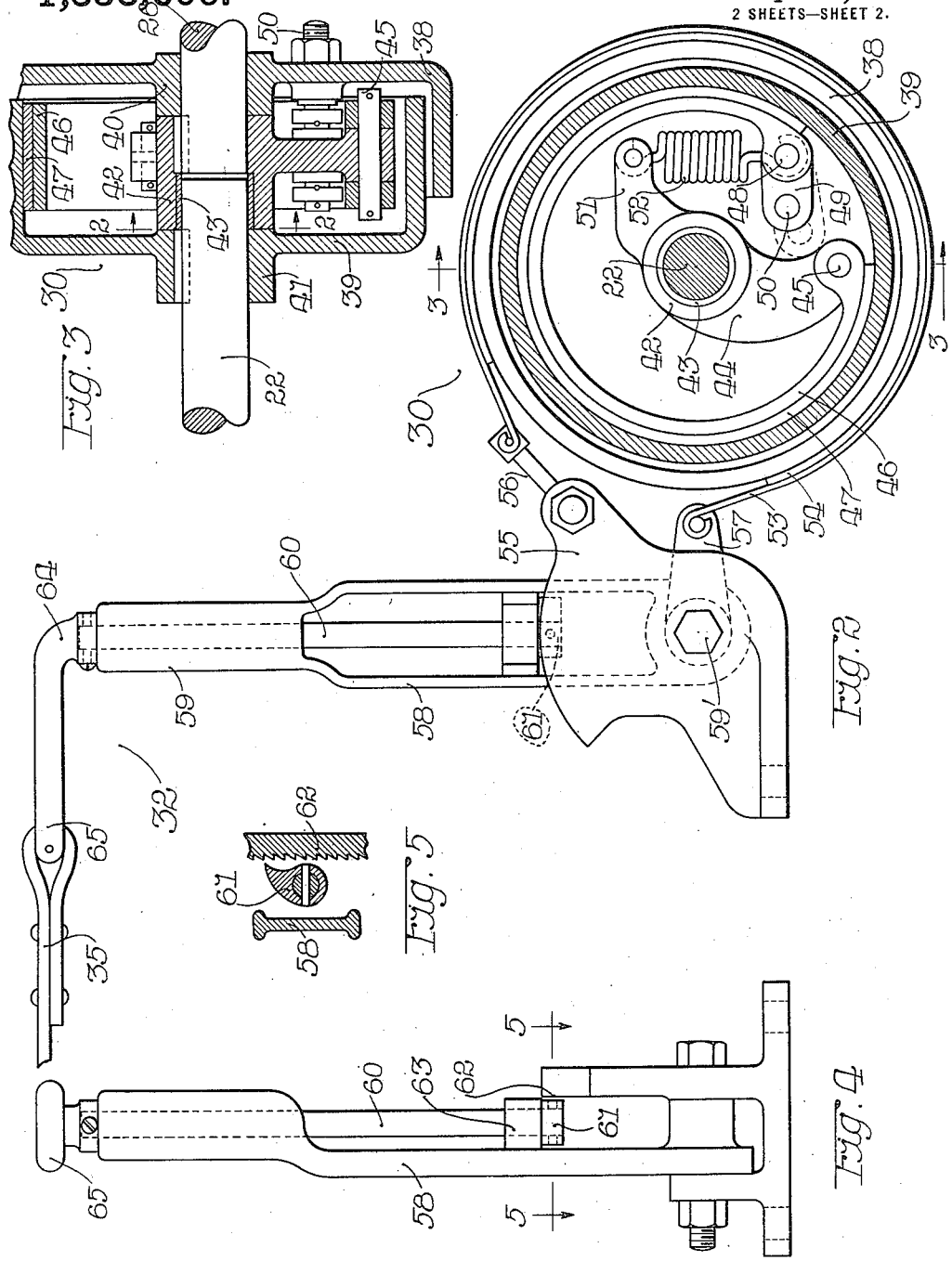

UNITED STATES PATENT OFFICE.

GEORGE R. NICHOLS, JR., OF CHICAGO, ILLINOIS; THE PEOPLES TRUST AND SAVINGS BANK OF CHICAGO ADMINISTRATOR OF SAID GEORGE R. NICHOLS, JR., DECEASED.

STEERING AND CONTROL MECHANISM FOR TRACTORS AND THE LIKE.

1,353,606.     Specification of Letters Patent.     Patented Sept. 21, 1920.

Application filed December 21, 1916. Serial No. 138,152.

*To all whom it may concern:*

Be it known that I, GEORGE R. NICHOLS, Jr., a citizen of the United States, residing at Chicago, in the county of Cook and State of Illinois, have invented a certain new and useful Improvement in Steering and Control Mechanism for Tractors and the like, of which the following is a full, clear, concise, and exact description, reference being had to the accompanying drawings, forming a part of this specification.

My invention relates to steering and control mechanism for tractors and the like. More particularly my invention relates to means for steering a tractor by means of reins or lines so as to make the same more suitable for use in connection with agricultural implements.

The control mechanism of my invention is useful in a tractor employing a pair of clutch and brake elements between the driving motor and the tractor wheels. A pull on one of the reins causes the clutch and brake element to be operated to direct the tractor toward the side of the rein which is pulled. Simultaneous pulling upon the reins causes the tractor to stop and release of each brake and clutch element is caused by pulling the reins at an angle.

In order to advise those skilled in the art more fully how to practice my invention, I shall now describe one embodiment of my invention in connection with the accompanying drawings which form a part of the present specification.

Figure 1 is a plan view with parts in section of a tractor embodying my invention, this tractor being shown as attached to an agricultural implement;

Fig. 2 is a side elevation of the control mechanism for the clutch and brake, the clutch and brake elements being shown in section, each section being taken on the line 2, 2 of Fig. 3;

Fig. 3 is a cross section of the clutch and brake taken on the line 3, 3 of Fig. 2;

Fig. 4 is a front elevation of the clutch controlling lever and ratchet shown in Fig. 2; and Fig. 5 is a fragmentary cross section taken on the line 5, 5, of Fig. 4.

In Fig. 1 I have shown a tractor 1 connected to an agricultural implement 2 as by means of the connecting link 3. The tractor 1 has a very short wheel base and comprises the front or driving wheels 4 and 5 and the pivoted trailing wheels 6 and 7. The front driving wheels 4 and 5 are dirigible through the mechanism which will be described later. These wheels are loosely connected upon a common shaft 8 and are provided with an internal gear as shown at 9 which may be formed integral with or made separate from the main body of the wheel. The tread of the wheels 4 and 5 may be suitably formed to obtain the necessary tractive effort. A generally rectangular frame-work 10 is connected to the shaft 8, the front of this framework projecting forward from the axle 8. The wheels 6 and 7 which I have termed "the pivoted trailing wheels" are connected to the rear end of the frame-work 10. The wheels 6 and 7 are provided with axle members 11 and 12 respectively, which are formed with a vertical portion coöperating with the brackets 13 and 14 to form vertical pivots. It is obvious that the connection between the axle of the wheels 6 and 7 and the vertical pivots in the brackets 13 and 14 need not be made of one continuous piece but may be formed as desired. The point to be considered is the necessity for placing the vertical pivots in front of the center of the wheels so that the wheels may trail readily.

The frame 10 comprises a pair of side pieces 15 and 16 which are connected by a plurality of transverse members 17, 18 and 19 which may be formed of angle-iron or the like. A driving motor 20, which is preferably an internal combustion engine, is mounted upon the frame-work 10 preferably on the forward central part of the frame, this motor having a driving shaft 21 extending toward the rear. A short countershaft 22 lying parallel to the main axle 8 is mounted upon a pair of cross-frame pieces 23 and 24, these cross pieces being connected to the frame members 18 and 19. Individual driving shafts for the wheels 4 and 5 are provided at 25 and 26, these shafts being axially in line with the shaft 22 and having upon their outer ends pinions 27 which mesh with the gears 9 that are mounted upon the driving wheels 4 and 5. The motor shaft 21 and the counter-shaft 22 are connected as by means of the bevel gears 28 and 29. The counter-shaft 22 is adapted to be connected to the driving shafts 25 and 26 by means of the clutch members 30 and 31. The clutch members 30 and 31 are similar being for right hand and left hand, respectively, these clutch members being provided with suitable control mechanisms 32 and 33. Leather reins or lines 34 and 35 are connected to the control mechanism, these lines being led back so as to be convenient to the operator who may be seated upon the seat 36, provided on the agricultural implement 2.

During the normal running of the machine straight ahead the clutch and brake members 30, 31, connect the shaft 22 with the shafts 25 and 26 so that equal power is transmitted to the main tractor wheels 4 and 5. When it is desired to direct the machine to the right the rein 34 is drawn backward to disengage the clutch member 30 so as to release the shaft 22 from the driving shaft 25 and at the same time exert a braking action upon the shaft 25 to positively stop the turning of the tractor wheel 4 so that the wheel 5 may advance more rapidly and thus execute the turn.

When it is desired to turn the machine to the left a pull on the left rein 35 accomplishes this result in the manner before described. When it is desired to stop the machine both the reins 34 and 35 are drawn upon so that the countershaft 22 is disengaged from both the driving shafts 25 and 26 which have a braking effort exerted upon them to positively stop the motion of the machine.

The structure of the clutch and brake 30 and its controller 32 is shown in Figs. 2 to 5, inclusive. The clutch and brake element 30 comprises a pair of concentric drums 38 and 39 which are open at one side and mounted by means of the hubs 40 and 41 respectively upon the ends of the shafts 22 and 26, respectively. The drum 39 is rigidly secured to the shaft 22 as by means of a suitable key or the like. The drum 38 is loosely mounted on the shaft 26 and is revoluble or partially revoluble thereupon. The inner ends of the shafts 22 and 26 project into a sleeve or hub member 42 which is provided with a bearing 43 for the inner end of the shaft 22 and which is secured as by means of a key or the like to the end of the shaft 26. The hub or sleeve member 42 is connected to a brake arm 44 which is connected by means of a pin 45 to an expanding band brake 46 provided with suitable brake lining 47. The opposite end of the brake band 46 is connected by means of a pin 48 to a link or links 49 which are pivoted upon a pin 50 which is mounted upon the side wall of the drum 38. An arm 51 connected to the hub or sleeve 42 carries at its outer end a spring 52 which is connected between this arm and the pin 48 thereby normally tending to hold the brake band 46 in contact with the surface of the brake drum 39. The shaft 22 is thereby connected to the shaft 26 inasmuch as the brake drum 39 is keyed to the shaft 22 and the arm 44 is keyed to the shaft 26 and these two parts are connected together by the friction between the brake drum 39 and the brake band 46. The brake drum 38 which is loose on the shaft 26 and which, as above explained, is connected to the ends of the brake band 46 by means of the link 49, is itself provided with a brake band 53 which has a lining 54 for engaging the face of the drum 38. One end of the band 53 is held stationary by means of the bracket 55 and the link 56. The bracket 55 is adapted to be mounted upon a suitable part of the frame 10 as is apparent from Fig. 1. The other end of the brake band 53 is connected to the short arm 57 of a bell crank brake lever 58 which is pivoted upon the pin 59' mounted on the bracket 55. The bell crank lever 58 is provided at its upper end with a tubular portion 59 which embraces the latch rod 60. The lower end of the latch rod 60 is provided with a pawl or latch 61 which is adapted to engage the teeth of a quadrant or ratchet 62. The rod 60 is supported in the bracket 63 adjacent the latch or pawl 61.

The upper end of the rod 60 is connected to an arm 64 having an eye 65 to which the end of the rein 35 is connected. When the rein 35 is pulled straight back the nose of the pawl 61 trails over the ratchet 62. As the rein is pulled the brake band 53 is tightened upon the brake drum 38 tending to retard the motion of the drum 38 with respect to the shaft 22. This action overcomes the tension on the spring 52 to such an extent as to release the brake band 46 from the driving drum 39, and any further tendency of the drum 38, the shaft 26 and connected parts to rotate relatively to the sleeve 42 is prevented by the engagement of the pin 50 with the arm 44 as shown in dotted lines in Fig. 2, and consequently under such conditions the shaft 26 and the tractor wheel geared thereto do not rotate.

Tension on the rein 35 may be relaxed but the nose of the pawl 61 engages the teeth of the ratchet 62 and holds the brake band 53 tight upon the drum 38. As a consequence the tractor wheel 5 is prevented from rotating, the other wheel 4 being still connected to the driving shaft 22 and being free to rotate in order to cause the tractor to turn.

When it is desired to cause the release of the braking member and to reëngage the clutch, the rein is drawn sidewise to swing the arm 64 and the rod 60 in such a direction as to disengage the nose of the pawl 61 from the ratchet 62 whereupon the tension upon the brake 53 is released either partially or wholly as may be desired.

The operation just described is typical of turning the tractor in either direction. When the particular brake is positively set the tractor turns on the short radius determined by its main axle 8. Turning on a greater radius can be accomplished by only partially setting the brakes.

In order to stop the machine both of the reins 34 and 35 are drawn straight backward so that the clutches are disengaged and so that the brakes are both set and held by means of the pawls 61. When it is desired to start the machine again the reins are drawn together at an angle so that the latch rods 60 are partially rotated whereby the pawls 61 are disengaged from the ratchets 62 and the clutches again engage and the brakes disengage.

I do not provide any reversing arrangement for the tractor but employ a motor 20 which may be started in either direction.

It can be seen from the above description that I have provided a tractor of great simplicity characterized by ease of control and certainty of operation. The short wheel base with the arrangement of trailing wheels greatly simplifies the problem of turning. While I have described my invention with reference to the detail of a particular embodiment, it is to be understood that the details may be varied and that the invention does not consist in the dimensions or proportions of the parts as these may be varied within the scope and object of my invention.

What I claim is:

1. In a tractor, a driving shaft, a pair of driving wheels, a pair of clutches for connecting said driving shaft independently to said driving wheels and control elements for said clutches, said control elements comprising each a lever, latch means for controlling the operation of each lever in one direction, a member pivotally mounted on each lever for controlling said latch means, and a single rein attached to each member for manipulating said latch means and lever.

2. In a tractor a driving shaft, a power shaft, a clutch member for connecting said shafts, said clutch member comprising a brake drum and a brake band normally held in engagement with each other, a spring for holding said drum and band in engagement, a releasing element for releasing said drum and band, a lever for operating said releasing element, a latch and ratchet mechanism for holding said lever in operative position, an arm angularly movable with respect to said lever, a rein attached to said arm, said lever being operated and said latch and ratchet mechanism being set by pulling on said rein out of the plane of movement of said lever and means to release said latch and ratchet mechanism by pulling upon said rein substantially in the plane of movement of said lever.

3. In combination, an operating lever, a rotatable shaft pivoted on said lever, a ratchet mechanism adjacent said shaft, a latch connected to said shaft and adapted to engage said ratchet, an arm connected to said shaft and means for disengaging said latch and ratchet, said means being operable to rotate said shaft.

4. In combination, an operating lever, a latch mounted on said lever, a ratchet adjacent said latch, said latch being adapted to engage said ratchet, an arm connected to said lever, said arm being adapted to be drawn in the plane of movement of said lever to operate said lever and to cause engagement of said latch and said ratchet, and a shaft connecting said arm and said ratchet, said shaft being connected to said arm, said shaft being rotatable about its axis to disengage said latch and said ratchet.

5. In combination a tractor wheel, a driving motor, a clutch for connecting said motor and said tractor wheel, control means for said clutch, said control means comprising a rein, means operated by pulling said rein in a given plane for disengaging said clutch, and means for reëngaging said clutch by pulling said rein at an angle to said given plane.

6. In combination a lever, pawl and ratchet mechanism for said lever, means for operating said lever and setting said pawl and ratchet, said means being movable in a given plane, said means comprising other means movable at an angle to said given plane for releasing said latch and ratchet mechanism.

In witness whereof, I hereunto subscribe my name this 18th day of December, A. D. 1916.

GEORGE R. NICHOLS, Jr.